Aug. 27, 1968  V. G. NULL  3,398,725
ROTARY ENGINE

Filed Nov. 16, 1966  5 Sheets-Sheet 1

INVENTOR
VICTOR G. NULL

BY
*Bedell & Burgess*
ATTORNEYS

INVENTOR
VICTOR G. NULL

BY
*Bedell & Burgess*
ATTORNEYS

Aug. 27, 1968 V. G. NULL 3,398,725
ROTARY ENGINE
Filed Nov. 16, 1966 5 Sheets-Sheet 3

INVENTOR
VICTOR G. NULL
BY
Bedell & Burgess
ATTORNEYS

INVENTOR
VICTOR G. NULL

BY
Bedell & Burgess
ATTORNEYS

Aug. 27, 1968   V. G. NULL   3,398,725
ROTARY ENGINE

Filed Nov. 16, 1966   5 Sheets-Sheet 5

INVENTOR
VICTOR G. NULL

BY
*Bedell & Burgess*
ATTORNEYS 3,398,725
ROTARY ENGINE
Victor G. Null, 5212 Von Phul,
St. Louis, Mo. 63107
Filed Nov. 16, 1966, Ser. No. 594,712
13 Claims. (Cl. 123—16)

ABSTRACT OF THE DISCLOSURE

A rotary internal combustion engine with its rotor journaled eccentrically within the engine housing in tangential relation with a portion of the housing. The rotor is formed with an axial passageway, a plurality of radial cavities, and radial passageways connecting the axial passageway and radial cavities. Pistons mounted in the radial cavities are yieldably biased outwardly into engagement with the housing to form vanes for propelling the rotor. The pistons are formed with longitudinal passages normally closed by pressure responsive check valves and the radial passageways from the rotor axial passageways are similarly closed, so that during outward movements of the pistons, fuel mixture is drawn from the axial passage in the rotor, into the piston cavities, and then, during inward movements of the piston the mixture is compressed within the piston cavities until, as the piston approaches the region of tangential relation, the compression is sufficient to open the check valve within the piston, and the mixture is injected into the annular space between the rotor and housing. A spark plug is mounted in the housing in this region to ignite the injected, compressed mixture, which expands against the posterior side of the piston to propel the rotor.

---

The invention relates to internal combustion engines, and more particularly to internal combustion engines of the rotary type.

Among the objects of the invention are the provision of an internal combustion engine having a much higher power to size and weight ratio than conventional internal combustion engines, the provision of a rotary internal combustion engine having a longer power stroke with greater overlap than other types of rotary or reciprocating engines, the provision of a rotary engine capable of more efficient cooling, more complete combustion, and more efficient intake breathing and the provision of an effective seal between the rotor and housing of a rotary internal combustion engine.

The foregoing and additional more detailed objects and advantages are achieved by the engine described hereinafter and illustrated in the accompanying drawings, in which:

FIG. 8 is an enlarged fragmentary perspective view of a portion of the peripheral seal between the rotor and engine housing.

Figure 2:
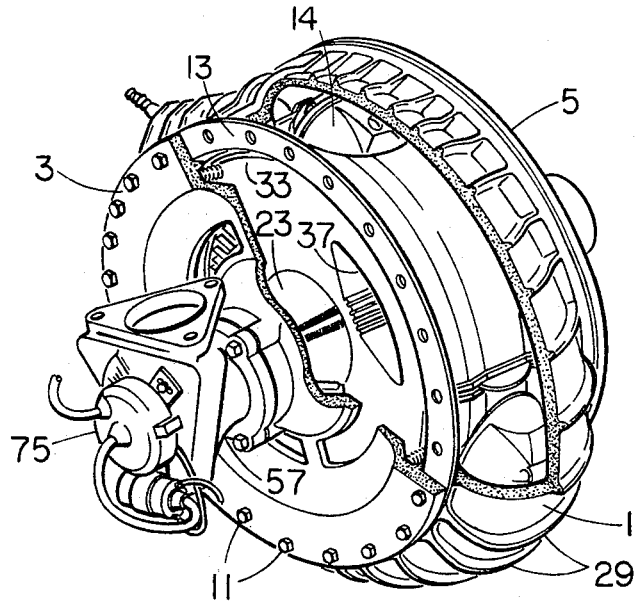
FIG. 2 is a perspective view similar to FIG. 1, but partially cut away to show the internal construction.
Figure 1:
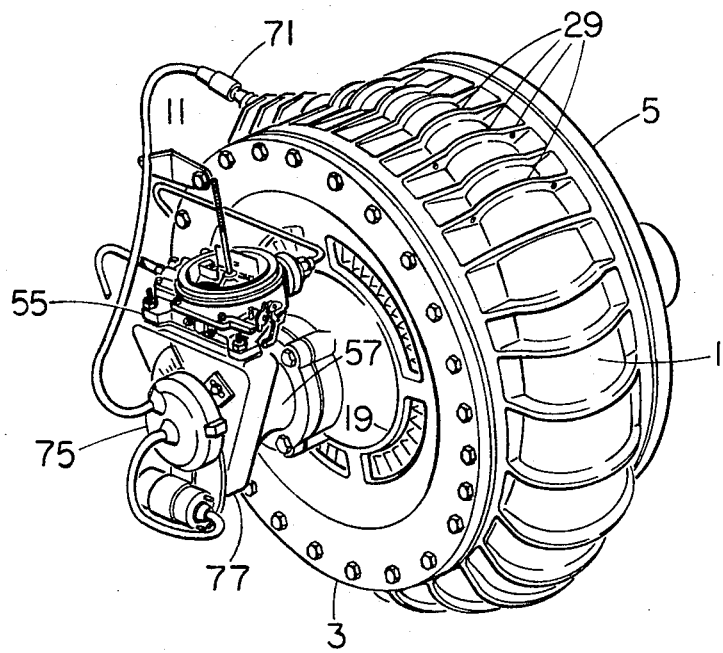
FIG. 1 is a perspective view of an engine embodying the invention.

The engine is enclosed by a housing comprising an annular body 1 and generally disk-shaped front and rear cover plates 3 and 5, detachably connected respectively to the front and rear faces 7 and 9 of body 1 by bolts 11, annular gaskets 13 being interposed between the cover plates and the body.

The central portions 15 and 17 respectively of cover plates 3 and 5 are of outwardly frusto-conical shape terminating in open cylindrical ends 19 and 21, and the rotor hub portions 23 and 25, of complementary shape, are rotatably received within the cover plate central portions, being journaled therein by means of roller bearings 27 positioned between the mating frusto-conical surface of rotor hub portions 23 and 25 and cover plate central portions 17 and 19.

Figure 4:
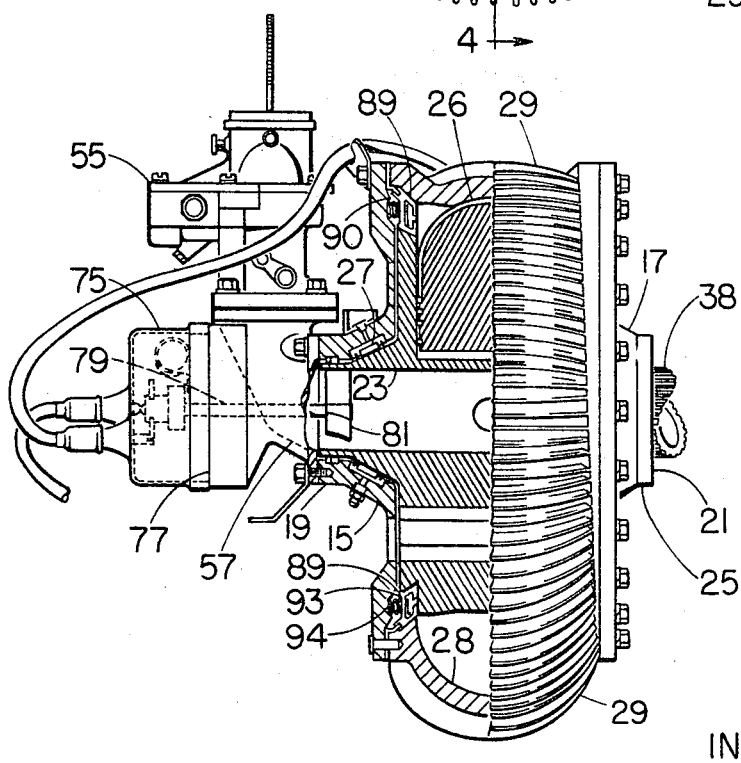
FIG. 4 is a side elevational view of the engine, partially sectionalized along line 4—4 of FIG. 3.
Figure 5:
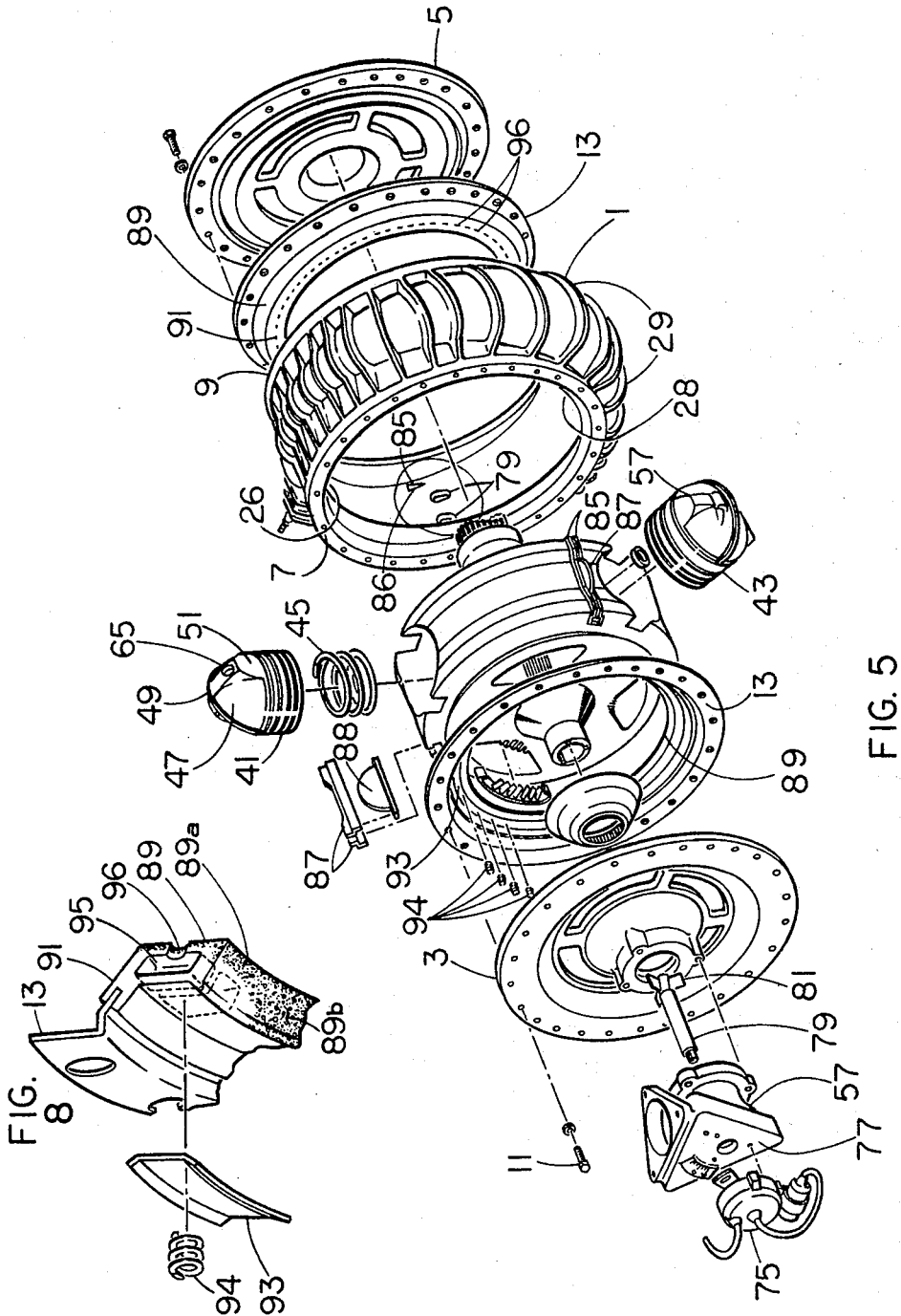
FIG. 5 is an exploded perspective view of the engine.
Figure 6:
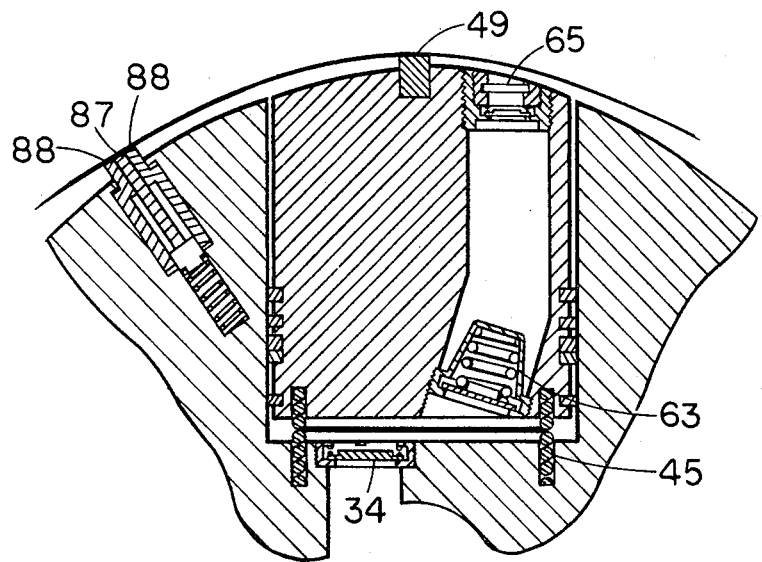
FIG. 6 is a vertical sectional view of one of the pistons and adjacent parts of the rotor.
Figure 7:
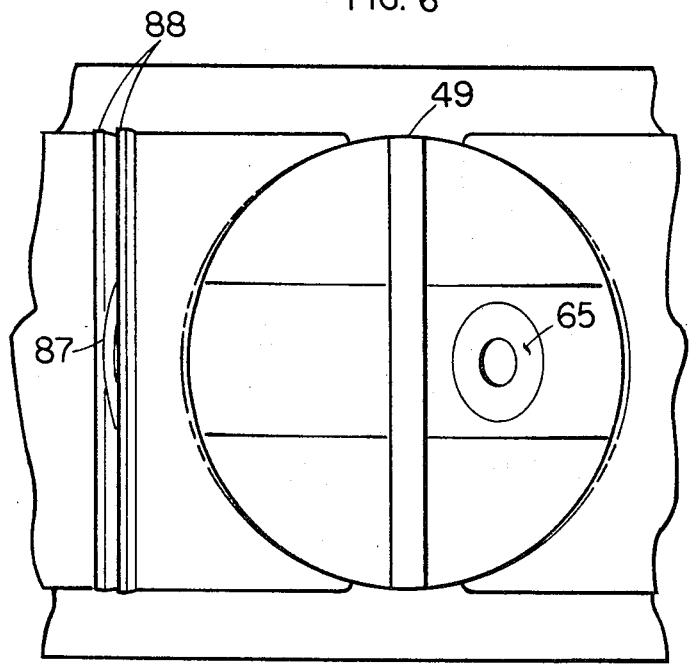
FIG. 7 is a top view of one of the pistons.

The inner surface of housing body 1 is substantially cylindrical with a concave toroidal cavity varying from a shallow segment cross section 26 at the top to a full semi-circular section 28 at the bottom, as best seen in FIG. 4, so that the rotor hub 23, 25 is eccentric with respect to the toroidal cavity. The outer surface of body 1 is formed with a large number of radial cooling fins 29, closely spaced from each other circumferentially of the body.

In addition to hub portions 23 and 25, the rotor has three hollow spokes 31, 33 and 35 containing radial cavities 32, 34 and 36, respectively, of noncircular, preferably elliptical cross section, and a rim 37, the radius of which is equal to the vertical distance (minor radius) from the rotational axis to the top of the inner cylindrical surface of the body, so that the rotor rim is tangent to the inner surface of the body on the vertical diameter of the latter. Hub portion 25 is suitably splined for torque-transmitting connection to splined end 38 of a drive shaft.

For impelling the rotor, identical pistons 39, 41 and 43 are slidably mounted for movement radial of the rotor in the rotor spoke cavities 32, 34 and 36 respectively and are biased outwardly into engagement with the toroidal cavity 26, 28 of body 1 by springs 45. Pistons 39, 41 and 43 are of the same noncircular cross section as these cavities so as to be nonrotatable therein.

Pistons 39, 41 and 43 function in part as the blades of the rotor and accordingly their outer ends 47 are of substantially oblate hemispherical shape grooved along a diameter parallel to the axis of rotation of the rotor to receive a semiannular sealing ring 49 engageable with the surface of toroidal body cavity 26, 28. The pistons outer ends 47 are also each formed with a pair of aligned radial ribs 51 at right angles to ring 49 and having a common arcuate end surface tangent to the ends 47 of the piston at their intersection with ring groove therein.

The fuel system comprises a carburetor 55 mounted on an intake elbow 57 secured to the central portion 19 of housing cover plate 3. Elbow 57 communicates with cylindrical passage 24 through rotor hub 23, 25, so that the fuel-air mixture provided by the carburetor may pass direct from the carburetor into this passage. Passage 24 communicates individually with the piston mounting rotor spoke cavities 32, 34 and 36 by means of check valves 59 in the bottoms of the spoke cavities. Check valves 59 are arranged to open to permit the passage of fuel mixture from hub passage 24 into the piston cavities when pressure in the latter is less than pressure within the hub cavity, and to close when pressure in the cavities exceeds that in the hub cavity.

Each of the pistons 39, 41, 43 is formed with an axially extending passageway 61 connecting the inner and outer ends on the leading side of sealing ring 49, both ends of passageway 61 being controlled respectively by one way check valves 63 and 65, which are spring loaded so as to open and permit the passage of fuel-air mixture from spoke cavities 32, 34 and 36 only when the mixture therein is compressed to a predetermined pressure substantially greater than that in hub intake passage 24.

Figure 3:
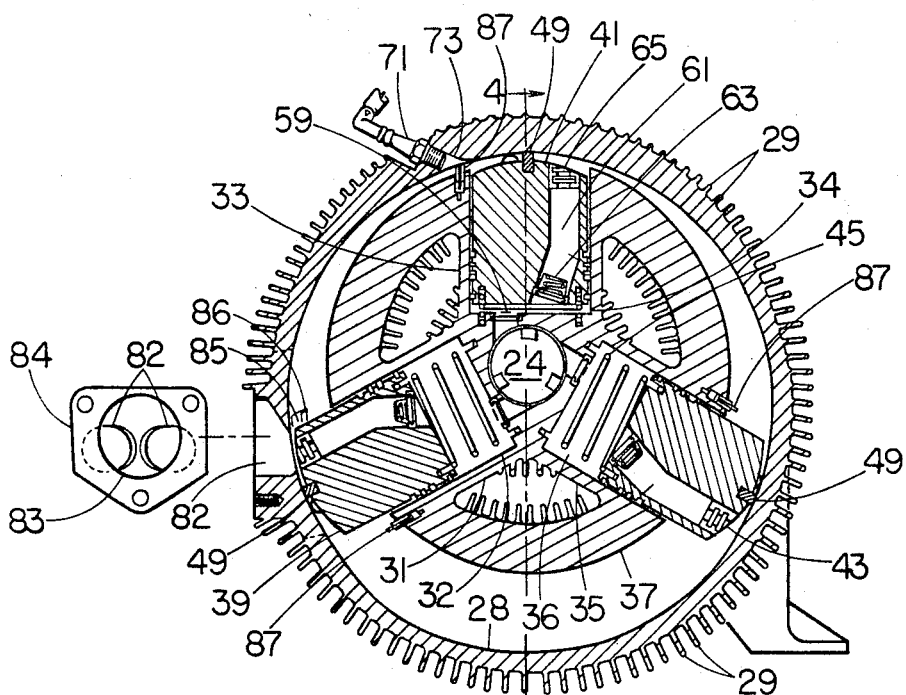
FIG. 3 is a transverse vertical sectional view of the engine, taken along line 3—3 of FIG. 4.

With the arrangement just described, the fuel-air mixture formed by carburetor 55 passes through intake elbow 57. As piston 41 moves clockwise 180° from the position shown in FIG. 3, it moves radially outward with its sealing ring 49 in constant sealing engagement with the toroidal inner surface 26, 28 of housing body 1. During cranking this radial movement of the pistons is caused by piston springs 45, while during operation of the engine the pistons are moved radially outwardly by centrifugal force. The atmospheric depression within spoke cavity 34, resulting from the rapid outward movement of piston 41, opens check valve 59 connecting the spoke cavity 34 with hub cavity 24 and draws the mixture into the spoke cavity 34, outlet check valve 63 remaining closed during this intake stroke. When piston 41 reaches its maximum radius position at the maximum depth portion 28 of the toroidal cavity, it begins to move radially inwardly as the rotor continues clockwise rotation, and outlet check valve 63 remains closed, thus closing inlet check valve 59 and compressing the mixture in the spoke cavity 34. At approximately 10° before top dead center, valves 63, 65 in piston 41 open responsive to a predetermined pressure in the cavity, thereby injecting the charge into the space forward of ring 49 of piston 41. As soon as all the gas has escaped from the cylinder, spark plug 71 mounted in a recess 73 in the upper toroidal cavity portion 26, at approximately 10° before top dead center, ignites the charge, which explodes in the space between the rotor and the toroidal cavity bounded by rings 49 of pistons 41 and 43. Because of the much greater exposed surface of piston 43, as compared with piston 41, the expanding gases act chiefly on the former, to drive it and the rotor clockwise.

A distributor 75 is mounted on vertical flange 77 of intake elbow 57 and distributor rotor shaft 79 is connected by spider 81 to rotor hub portion 23 whereby to cause the distributor to energize spark plug 71 when gas is injected into the combustion chamber.

At approximately 80° clockwise from bottom dead center, the housing is provided with a pair of radial exhaust ports 82 which merge into a single circular opening 83, surrounded by a flat surface 84, to which the exhaust pipe or manfold (not shown) would be secured.

With this arangement, as piston 41, for example, reaches exhaust ports 82, the spent gases between piston 41 and succeeding piston 39 would be forced out of the exhaust ports by the movement of the piston 39 toward the exhaust ports.

Immediately posterior exhaust ports 82, in the direction of rotation, is air intake port 85, normally closed by a reed 86 or other suitable one-way valve arranged to admit air to the engine compression chamber but to close at all other times, so that as piston 41 passes port 85, it draws a supply of fresh air through port 85, which is compressed as piston 41 moves toward the top dead center position.

In order to ensure a complete seal between the rotor and housing in the regions of highest compression, the rotor is slotted immediately posterior to each piston and each said slot contains a seal comprising a pair of spring loaded wiper bars 87 and a spring-loaded semidisk 88 disposed between bars 87. Bars 87 are biased radially outwardly into sliding engagement with the housing cylindrical inner surface portions which form ledges on both sides of the toroidal cavity, and throughout the shallow upper portions 26 of the toroidal cavity semidisk 88 is maintained in sliding engagement with the toroidal surface to prevent back-up of the exploded gas into the compression chamber following the combustion chamber.

A circumferential seal, comprising a hollow elastomeric annulus 89 of substantially parallelogram cross section with its outer side extended and slotted as at 91 to fit on the inner margin of gasket 13, is mounted thereon with its inner sides engaging the outer marginal portions of rotor rim 37, which are rabbeted as at 90 to accommodate annulus 89. For maintaining annulus 89 in place, it is backed up on its side remote from the rotor by an annulur metal strip 93, which engages small coil springs 94, seated on the rims of housing covers 3 and 5. The hollow interior of annulus 89 is divided into small compartments by radial partitions 95, each of which communicates with the compression chamber by means of a small hole 96 so that during the compression and power strokes, air forced into these compartments expands annulus 89 to create an airtight seal. In order to facilitate the rotational sliding of rotor rim 37 relative to annulus 89, the inner sides 89a and 89b of the latter are preferably impregnated with copper granules.

Operation of the engine is as follows: The engine is started by cranking (either by hand or by a power starter). With the parts in the position shown in FIG. 3, as the rotor is rotated by cranking, piston 41, during its rotation from top to bottom dead center position, is pushed radially outwardly in its cavity by its spring 45, its outward movement being limited by its engagement with the toroidal cavity 26, 28 in the housing body. The outward movement of piston 41 draws gas through check valve 59 from hub passage 24. Meanwhile rotation of the rotor causes piston 39 to compress fresh air admitted to the space between rotor and housing through port 86, and continued radial inward movement of piston 39 continues to compress the gas in spoke cavity 32 until piston 39 reaches approximately 10° before top dead center, when its valves 63 and 65 release the compressed gas into the combustion chamber between the rotor and the housing, where they are ignited by spark plug 71, which fires upon the release of gases from piston 39. The exploding gases, whose expansion rearwardly into the compression chamber anterior to the spark plug cavity is prevented by the engagement of back-up seals 87, 88 with the inner surface of the housing, then act on the surface portion of piston 41 protruding from the rotor, which is approximately 110° clockwise from top dead center. During the same interval, piston 43 has drawn a full charge of gas into its cavity through its inlet check valve 59, has begun to compress the charge and has moved to the 230° position. During further rotation of the rotor, due in part to cranking and in part to the expansion of the gases against the backside of piston 41, piston 43 moves from the 230° position toward the top dead center position, and in so doing compresses air admitted into the compression chamber posterior to the exhaust port through air intake port 85 in the wake of piston 39, thus providing a precompressed quantity of air in the chamber, to which the compressed fuel mixture will be added when piston 43 reaches 10° before top dead center. At the same time, as piston 43 rotates from bottom toward top dead center, it moves radially inwardly, compressing the fuel mixture (gas) in spoke cavity 36. Upon reaching 10° before top dead center, valves 63 and 65 of piston 43 open, permitting the injection therethrough of fuel mixture into the combustion chamber between the piston crown and the housing cavity, where it is ignited by spark plug 71 and explodes, acting principally on the backside of piston 39, which has moved toward the 110° position, to propel the rotor clockwise. During continued movement of the rotor, piston 39 has drawn a full charge into spoke cavity 32 from hub passage 24, and after reaching bottom center moves radially inwardly of the rotor to compress the charge. As piston 39 passes exhaust ports 82, the spent gases between it and piston 43 are ejected, and fresh air drawn into the engine through port 85 in the wake of piston 41 is compressed in the space between the rotor and housing anterior to the spark plug cavity at 10° before top center.

Figure 9:
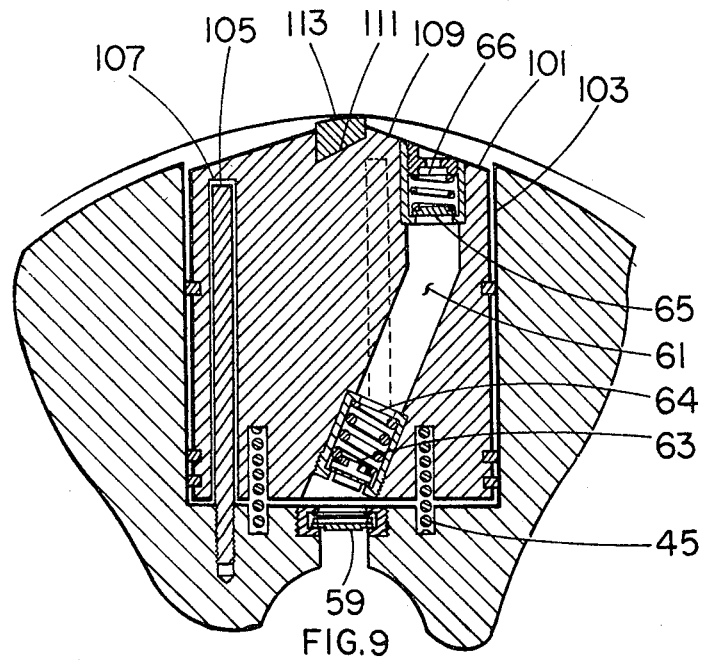
FIG. 9 is an enlarged vertical section of a modified piston showing adjacent portions of the rotor.
Figure 10:
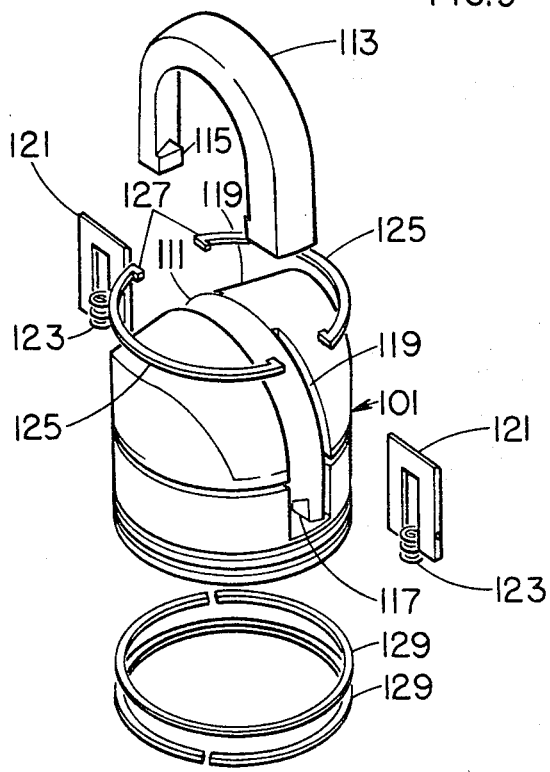
FIG. 10 is an exploded perspective view of the modified piston of FIG. 9.
Figure 11:
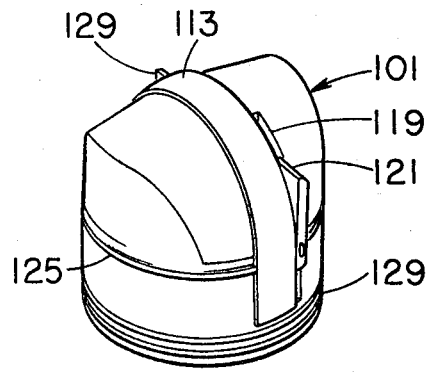
FIG. 11 is a perspective view of the modified piston assembled.

FIGS. 9 and 10 illustrate a modified form of piston 101 whereby the back-up seal 85, 87 may be dispensed with. Piston 101 is of cylindrical cross section and is retained against rotation in its rotor cavity 103 by rod 105 fixed in the base of the cavity and slidably received in bore 107 in the cavity. Crown 109 of piston 101 is of circular cross section in a plane passing through the rotor axis and is slightly gabled in the general plane of the rotor, being grooved at 111 along its ridge to receive a compression semiring 113 with a similarly gabled outer surface to present an edge contact with the inner surface of the toroidal cavity 26, 28 of the housing. At its extremities, semiring 113 is formed with inwardly directed bosses adapted to be received in cooperating recesses 117 in the ends of groove 111 for retaining the ring in place in the piston crown. Adjacent the trailing edge of groove 111, the piston is formed with a pair of deep slots in which are vertically slidably mounted plates 121, each centrally apertured to receive a spring 123 biasing them outwardly into sealing engagement with the cylindrical ledges adjoining the toroidal cavity in the housing body, thus effecting the same seal provided by bars 85 in the previous embodiment. Surrounding the piston at the base of the crown is a scraper ring made in two nearly semicircular parts each formed with radially inward projections 127, for engagement with cooperating notches in the piston. At a lower level, the piston is provided with compression rings 129.

The invention may be modified in various respects as will occur to those skilled in the art and the exclusive use of all modifications as come within the scope of the appended claims is contemplated.

I claim:

1. A rotary internal combustion engine comprising a circular housing, a rotor eccentrically journaled within said housing in substantially tangential relation with a portion of said housing, said rotor having a plurality of radially-extending cavities spaced apart circumferentially of the rotor, said cavities being open at their outer ends, pistons slidably mounted in said cavities and having outer end surfaces sealingly engageable with the interior surface of said housing, a source of gaseous fuel mixture, an axial passage in said rotor communicating with said source, connections between said axial passage and each of said piston cavities inwardly from said pistons, check valves in said connections responsive to pressure differential between said piston cavities and said axial passage permitting the flow of the gaseous mixture from said axial passage to said piston cavities and preventing its return, a passage through each of said pistons, a check valve in each said piston passage permitting the gaseous mixture to pass from said piston cavity to the space surrounding said rotor but preventing return of gaseous mixture to said cavity, said pistons being yieldably biased radially outwardly of said rotor into sliding engagement with said housing whereby to draw the gaseous mixture from said axial passage through said connecting check valves into said piston cavities as said pistons move away from the region of tangential engagement and to compress the gaseous mixture in said piston cavities as said pistons move radially inwardly during rotation toward the region of tangential engagement, said piston check valves then opening to inject a quantity of the compressed gaseous mixture into the space between said rotor and housing, gas ignition means in said housing in the region of tangential engagement between said housing and said rotor to explode said gaseous mixture therein expanding the same against each piston posterior to the region of tangential engagement and thereby causing rotation of said rotor.

2. A rotary internal combustion engine according to claim 1 including a distributor carried by said housing and including a rotor shaft, said distributor rotor shaft being coaxial with and rigidly connected to said rotor, and electrical conduction means connecting said distributor with said ignition means whereby to energize the latter upon the injection of gas into the space between said rotor and said housing.

3. A rotary internal combustion engine according to claim 1 including means projecting from said rotor in circumferentially spaced relation posterior to each said piston and engageable with the peripheral inner surface of said housing to form a seal preventing passage rearwardly thereof of said compressed gas.

4. A rotary internal combustion engine according to claim 1 in which said housing has a cylindrical peripheral wall formed with an eccentric circular toroidal cavity, the outer ends of said pistons having semicircular portions sealingly engageable with said cavity.

5. A rotary internal combustion engine according to claim 4 in which said rotor is concentric with said cylindrical wall, its eccentricity being with respect to said toroidal cavity.

6. A rotary internal combustion engine according to claim 4 in which said projecting means comprises a first part engageable with said cylindrical wall and a second part engageable with said toroidal cavity in the region of tangential relation between said housing and said rotor.

7. A rotary internal combustion engine according to claim 6 including means resiliently biasing said parts into engagement with said cylindrical wall and toroidal cavity respectively.

8. A rotary internal combustion engine comprising a circular housing, a rotor eccentrically journaled within said housing in substantially tangential relation with a portion of said housing, said rotor having a plurality of radially-extending cavities spaced apart circumferentially of the rotor, said cavities being open at their outer ends, pistons slidably mounted in said cavities and having outer end surfaces sealingly engageable with the interior surface of said housing, and means for injecting a quantity of compressed gas into the space between said rotor and housing in the region of tangential engagement therebetween, said gas being explosible therein whereby to act against a piston remote from the region of tangential engagement and thereby cause rotation of said rotor, said housing having a cylindrical peripheral wall formed with an eccentric toroidal cavity, the outer ends of said pistons having semicircular portions sealingly engageable with said cavity, and coplanar plate-like elements projecting from the outer end portions of said piston, the common planes of said plate-like elements being adjacent to the periphery of said piston along a diameter of said piston transverse of the general plane of said rotor, said plate-like elements being engageable with said cylindrical wall.

9. A rotary internal combustion engine according to claim 4 in which said piston end portions comprise a substantially semiring having inward bosses at their extremities, said pistons being formed with grooves across their ends to receive said semirings, said grooves being deepened at their ends to form recesses lockingly receiving said semiring inward bosses.

10. A rotary internal combustion engine according to claim 1 in which there are annular gaskets between the circular periphery and transverse ends of said housing, said gaskets projecting radially into the interior of said housing and there mounting compressible elastomeric annuli at the intersections of its circular periphery with its transverse ends, said rotor being annularly rabbeted at the intersection of its circumferential and transverse surfaces, said elastomeric annuli being slidably received in the rabbeted portions of said rotor.

11. In a rotary internal combustion engine having a housing comprising a circular periphery and spaced transverse walls with annular gaskets between said periphery and transverse walls and projecting radially into the interior of said housing, and a circular rotor rotatably mounted in said housing and having a circular peripheral surface and spaced transverse surfaces, compressible elastomeric annuli mounted on the inwardly projecting portions of said gaskets in said housing at the intersections of said periphery and said transverse walls, said rotor being annularly rabbeted at the intersections of its peripheral surface and its transverse surfaces, said elastomeric annuli being slidably received in the rabbeted portions of said rotor.

12. In a rotary internal combustion engine having a housing comprising a circular periphery and spaced transverse walls, and a circular rotor rotatably mounted in said housing and having a circular peripheral surface and spaced transverse surfaces, compressible elastomeric annuli mounted in said housing at the intersections of said periphery and said transverse walls, said rotor being annularly rabbeted at the intersections of its peripheral surface and its transverse surfaces, said elastomeric annuli being slidably received in the rabbeted portions of said rotor, said annuli being hollow and divided circumferentially into a plurality of compartments, there being holes through the inner transverse sides of said annuli individually providing communication between said compartments and space between said rotor and said housing.

13. In a rotary internal combustion engine according to claim 12, the sides of said annuli engaging said rotor being impregnated with metal whereby to facilitate rotary sliding movement of said rotor with respect to said annuli.

References Cited

UNITED STATES PATENTS

| | | | |
|---|---|---|---|
| 1,217,733 | 2/1917 | Femons | 123—16 |
| 1,859,618 | 5/1932 | Cleland | 123—16 |
| 2,904,019 | 9/1959 | Shimomura | 123—8 X |
| 3,181,512 | 5/1965 | Hapeman | 123—16 |

RALPH D. BLAKESLEE, *Primary Examiner.*